US007223356B2

(12) United States Patent
Chartier et al.

(10) Patent No.: US 7,223,356 B2
(45) Date of Patent: May 29, 2007

(54) METHOD FOR PREPARING A THIN CERAMIC MATERIAL WITH CONTROLLED SURFACE POROSITY GRADIENT, AND RESULTING CERAMIC MATERIAL

(75) Inventors: Thierry Chartier, Feytiat (FR); François Guillotin, Marly (FR)

(73) Assignee: L'Air Liquide, Société Anonyme à Directoire et Conseil deSurveillance pour l'Étude et l'Exploitation des Procédés Georges Claude, Paris (FR)

( * ) Notice: Subject to any disclaimer, the term of this patent is extended or adjusted under 35 U.S.C. 154(b) by 255 days.

(21) Appl. No.: 10/433,042

(22) PCT Filed: Nov. 26, 2001

(86) PCT No.: PCT/FR01/03716

§ 371 (c)(1),
(2), (4) Date: Sep. 22, 2003

(87) PCT Pub. No.: WO02/46122

PCT Pub. Date: Jun. 13, 2002

(65) Prior Publication Data

US 2004/0053101 A1    Mar. 18, 2004

(30) Foreign Application Priority Data

Dec. 7, 2000    (FR) .................................. 00 15919

(51) Int. Cl.
*B32B 3/26* (2006.01)
*B32B 5/14* (2006.01)
*B32B 5/18* (2006.01)

(52) U.S. Cl. .................. 252/500; 264/628; 427/376.1; 427/430.1; 428/307.3; 428/307.7; 428/316.6; 428/322.7; 428/613; 429/30; 429/33; 95/54; 205/765; 156/244.27

(58) Field of Classification Search ................ 427/243, 427/376.1, 430.1; 428/307.3; 204/252; 429/33; 264/218; 252/518.1
See application file for complete search history.

(56) References Cited

U.S. PATENT DOCUMENTS 4,777,153 A    10/1988  Sonuparlak et al.

(Continued)

FOREIGN PATENT DOCUMENTS

EP    0 212 230    3/1987

(Continued)

OTHER PUBLICATIONS

International Search Report for PCT/FR01/03716.

(Continued)

*Primary Examiner*—Mark Kopec
*Assistant Examiner*—Kallambella Vijayakumar
(74) *Attorney, Agent, or Firm*—Christopher J. Cronin

(57) ABSTRACT

The invention concerns a method for preparing a thin ceramic material with controlled surface porosity gradient, including (A) infiltrating a porous pore-forming substrate of controlled thickness, with a ceramic material suspension; (B) evaporating the solvent; (C) a step which includes eliminating the pore-forming agents and the various organic additives, and (D) a sintering step. The invention also concerns the use of the ceramic material in the method for preparing a solid electrolyte and a mixed ionic-electronic conductor, in methods for preparing ultra-pure oxygen, for eliminating oxygen from a gaseous atmosphere, for producing heat energy, for preparing gas or liquid filtering membranes, for ceramic/metal joints, for biomaterials and sensors.

12 Claims, 7 Drawing Sheets

U.S. PATENT DOCUMENTS

| | | | |
|---|---|---|---|
| 4,780,437 A | | 10/1988 | Smith |
| 4,883,497 A | | 11/1989 | Claar et al. |
| 5,030,396 A | | 7/1991 | Saita et al. |
| 5,547,494 A | * | 8/1996 | Prasad et al. ............ 95/54 |
| 5,683,797 A | * | 11/1997 | Carolan et al. ......... 428/307.3 |
| 5,762,737 A | | 6/1998 | Bloink et al. |
| 5,834,108 A | * | 11/1998 | Shimai et al. .......... 428/307.3 |
| 5,846,664 A | | 12/1998 | Third et al. |
| 5,902,429 A | | 5/1999 | Apté et al. |
| 6,207,038 B1 | | 3/2001 | Steil et al. |
| 6,264,807 B1 | * | 7/2001 | Fenner et al. ............ 204/252 |
| 6,605,316 B1 | * | 8/2003 | Visco et al. ............ 427/115 |
| 6,613,384 B1 | * | 9/2003 | Waller ................. 427/243 |

FOREIGN PATENT DOCUMENTS

| | | | |
|---|---|---|---|
| FR | 2550188 | * | 2/1985 |
| FR | WO 95/32050 | * | 11/1995 |
| FR | 2 780 717 | | 1/2000 |
| GB | WO 00/48717 | * | 8/2000 |
| JP | 9 132 459 | | 5/1997 |
| WO | WO 98/48918 | | 11/1998 |
| WO | WO 99/21640 | * | 5/1999 |

OTHER PUBLICATIONS

Rice, Roy W.: "*Porosity of ceramics*", Marcel Dekker, 1998, pp. 20-21.

Lyckfeldt, O., et al.: "*Processing of thermal insulation materials with controlled porosity*", Low Expansion Materials, pp. 217-229.

Apté, P. S., et al., Journal of American Ceramics Society, 82, 7, 1999, pp. 1693-1701.

* cited by examiner

METHOD FOR PREPARING A THIN CERAMIC MATERIAL WITH CONTROLLED SURFACE POROSITY GRADIENT, AND RESULTING CERAMIC MATERIAL

BACKGROUND

The subject of the invention is a novel method for preparing a thin ceramic material with a continuous controlled surface porosity gradient and its use for producing electrochemical cells that conduct by oxide ions. This object is characterized by a continuous variation in porosity from 0% to about 80% of small thicknesses.

Porous ceramics have physico-chemical properties, whether thermal stability, chemical stability, biocompatability or mechanical strength, which make them good candidates for various applications such as filter membranes, sensors, ceramic-to-metal seals, biomaterials, energy conservation, thermal insulation or catalysis. These materials are used in particular for their low density, their high exchange area and their high permeability thanks to their open porosity.

As techniques for creating porosity in a ceramic, there are:
incomplete sintering of ceramic particles;
introduction of porosity by an emulsion of the material before sintering;
use of pore formers removed before sintering;
forming operations such as extrusion, injection molding, rapid prototyping; and
the use of ceramic fibers.

These methods are listed in Roy W. Rice, "Porosity of ceramics", Marcel Dekker, 1998, pp 20–21.

Incomplete sintering or subsintering of a ceramic powder or of a blend of ceramic powders having different particle sizes does not allow a porosity of greater than 50% to be achieved.

The use of pore formers, removed for example by pyrolysis before sintering, and leaving pores as the negative thereof in the ceramic, is one of the most appropriate methods for producing materials whose porosity is controlled in terms of volume fraction, shape and size distribution of the pores. Incorporating particulate pore formers, such as starch, lattices, graphite or resins into ceramic suspensions or slurries makes it possible to obtain uniformly distributed pores in a dense ceramic matrix. Depending on the forming method— pressing, casting in a mold, tape casting, extrusion or injection molding—a material is obtained with a plane geometry, a tubular geometry or a geometry of more complex shape.

Several embodiments of this technique of incorporating pore-forming particles into a ceramic suspension are disclosed in United States patents published under the numbers U.S. Pat. No. 4,777,153, U.S. Pat. No. 4,883,497, U.S. Pat. No. 5,762,737, U.S. Pat. No. 5,846,664 and U.S. Pat. No. 5,902,429 and in the publications by Lyckfeldt et al. and Apté et al. (O. Lyckfeldt, E. Lidén, R. Carlsson, "*Processing of thermal insulation materials with controlled porosity*", Low Expansion Materials, pp 217–229; S. F. Corbin, P. S. Apté, J. Am. Ceram. Soc., 82, 7, 1999, pp 1693–1701). Apté et al. describe in particular a method using the tape casting of ceramic suspensions containing pore-forming particles and the thermocompression of the tapes in order to obtain, after sintering, a porous material with a discrete porosity gradient.

The pore former may also be a preform impregnated with a ceramic suspension (ceramic powder+solvent+organic additives).

The infiltration of polymer foams by a ceramic suspension is used to obtain bulk ceramics having a substantial open porosity. In this case, the total porosity is directly due to the structure of the foam, but this technique does not allow micron pore sizes to be achieved and cannot be used to prepare thin materials.

U.S. Pat. No. 4,780,437 discloses a method for preparing thin porous materials by infiltration of a flocking of pyrolyzable pore-forming fibers by a ceramic suspension. The materials obtained by this method have oriented anisotropic pores.

EP 0 212 230 discloses a method for preparing a ceramic filter, allowing a uniform porosity to be obtained throughout the filter.

Now, controlling the structure, whether as a dense system or a porous system with a porosity gradient, and controlling the microstructure, especially the particle size distribution and the pore size distribution of a ceramic article represents a key factor as regards its intrinsic properties and as regards its applications in terms of performance, reproducibility, lifetime and cost.

At the present time, it is not known how to manufacture a thin ceramic membrane, having a thickness of a few hundred microns, possessing a continuous controlled surface porosity gradient ranging from 0% (dense ceramic) to about 80% (highly porous system) in a single operation. All the articles produced using the various known methods have discrete or discontinuous controlled porosity gradients. Now, the presence, even in the same material, of these discrete porosity gradients may cause, at the various interfaces, layer debonding and delamination phenomena, especially because of the differences in thermal expansion coefficients between these regions. This results in rapid degradation of the article.

The fact of being able to produce a continuous controlled porosity gradient in a material should prevent the succession of interfaces between the layers of different porosity and consequently avoid these degradation phenomena.

In the production of electrochemical cells formed from a dense solid-state electrolyte and electrodes, called volume electrodes, such as those described in international patent application WO 95/32050, the fact of controlling a microstructure with a continuous controlled surface porosity gradient should make it possible:

to promote physical compatibility and chemical compatibility between volume electrode and dense solid-state electrolyte and thus improve the cohesion of the interface between these two materials;

to limit the energy costs associated with interfacial overpotentials; and to promote the diffusion, disassociation and recombination of oxygen throughout the three-dimensional edifice of the volume electrode/dense solid-state electrolyte porous structure, by uniformly delocalizing volumewise the electrode reaction.

The electrochemical cells thus formed have improved electrochemical performance in terms of electrochemical performance (current density applied per unit area), lifetime, aging and energy cost.

SUMMARY

The invention includes both methods and apparatus to achieve the desired results, as described, but is not limited to the various embodiments disclosed.

This is why the subject of the invention is a method for preparing a thin ceramic material with a continuous controlled surface porosity gradient, characterized in that it comprises:
- a step (A) of infiltrating a porous pore-forming substrate of controlled thickness with a suspension of a ceramic material;
- a step (B) of solvent evaporation, in order to form a pore former/solid ceramic composite structure;
- a debinding step (C); and
- a sintering step (D).

BRIEF DESCRIPTION OF THE DRAWINGS

For a further understanding of the nature and objects for the present invention, reference should be made to the following detailed description, taken in conjunction with the accompanying drawings, in which like elements are given the same or analogous reference numbers and wherein.

DESCRIPTION OF PREFERRED EMBODIMENTS

Figure 1:
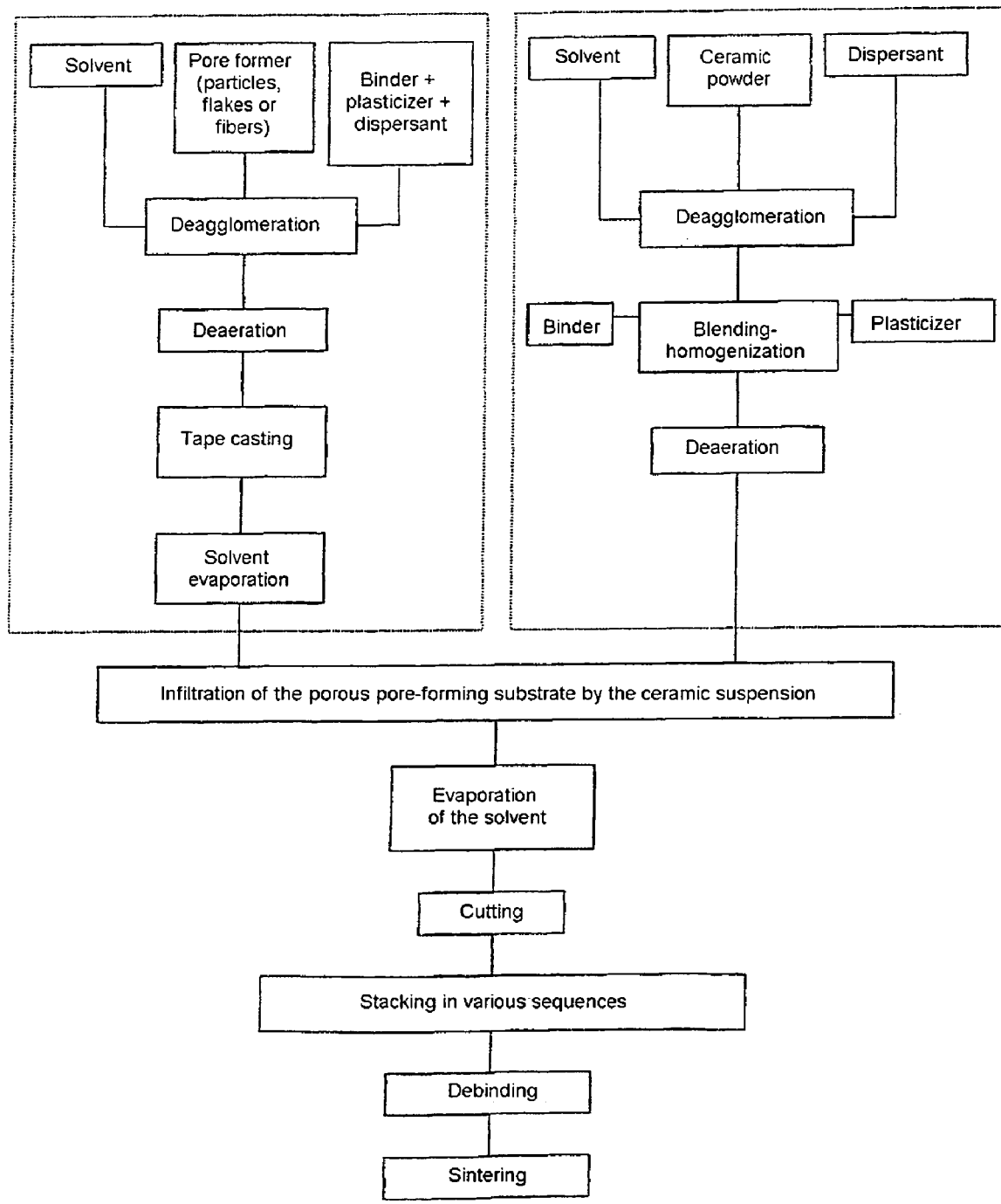
FIG. 1 illustrates the various steps of the method for producing a ceramic membrane with a continuous controlled surface porosity gradient in accordance with one illustrative embodiment of the present invention.

The invention includes both methods and apparatus to achieve the desired results, as described, but is not limited to the various embodiments disclosed.

In the definition of the method forming the subject of the present invention, the term "thin" is generally understood to mean a thickness of between about 0.05 mm and about 2 mm and more particularly between about 0.25 mm and about 1 mm.

In the definition of the method forming the subject of the present invention, by the expression "continuous controlled surface porosity gradient" is meant that the porosity of said material varies from a value tending toward 0%, at one of its faces (called the dense surface), to a value tending toward about 80% at its opposite face (called the porous face).

The term "surface porosity" is understood to mean the pores on the surface of the component that are accessible to a fluid, for example a gas in the case of the operation of an electrochemical cell or to a liquid, such as a suspension or a molten metal, in the case of infiltration.

When the ceramic material is intended for the manufacture of a membrane allowing oxygen ions to pass through it, the porosity of the material at the dense face is around 0% and is less than or equal to 80%, more particularly about 60%, at the porous face.

The expression "porous pore-forming substrate" denotes a porous stack of solid pore-forming particles or of a blend of solid pore-forming particles, of the same or different size and/or shape and/or nature. The porosity of the substrate is between about 20% and about 90% and preferably greater than or equal to 30% and less than or equal to 70%, and more particularly about 40%. The porosity of the porous pore-forming substrate correspond to the interstices between the pore former or formers, whether these be particles, flakes or fibers. This interconnected stack porosity, also called open porosity, allows infiltration by the ceramic suspension.

The term "pore former" denotes any material capable of being removed, by thermal decomposition during the debinding step prior to sintering, leaving pores in the material obtained after this step and without leaving residues. As pore formers, it is preferred to use polymers existing in particulate form and in relatively isotropic form such as, for example, micronized polypropylene waxes (for example, PROPYLTEX™270S or PROPYLTEX™325S from MicroPowders, Inc.), polyamides (for example, ORGASOL™ from Elf Atochem), latexes, polytetrafluoroethylene or polystyrene spheres. As pore formers, cellulose fibers (for example ARBOCEL™BE600-10 from Rettenmeier), starches (for example standard corn starch, SP standard wheat starch or potato starch from Roquette Frères, or REMYRISE™DR rice starch from Rémy) or graphite are also used.

The term "ceramic suspension" indicates, within the context of the present invention, that the suspension has a suitable viscosity and suitable rheological behavior for it to infiltrate into the porous pore-forming substrate so as to induce a continuous pore-filling gradient, ranging from 0% filling of the pores, at the face opposite the infiltration face, up to about 80% at the infiltration face.

The infiltration step (A) is carried out, for example, by the technique called tape casting. This technique is particularly appropriate when it is desired to obtain a ceramic material of planar shape. It is also possible to use it to produce tubes by winding, for example around a mandrel, dense and porous ceramic sheets.

The gradient of infiltration of the porous pore-forming substrate with the ceramic suspension is obtained by controlling its viscosity and its Theological behavior. Increasing the proportion of organic phase in the suspension, making it possible to produce the pore-forming substrate, reduces the porosity of the latter by closing up the interstices between the pore-forming entities and making it more difficult for a ceramic suspension of a given viscosity to infiltrate. Increasing the viscosity or the shear-thinning character of the ceramic suspension also makes infiltration of the porous pore-forming substrate more difficult.

The solvent evaporation step (B) is, if necessary, carried out by circulation of a stream of hot air.

The debinding step (C) consists in eliminating the pore formers and the various organic auxiliaries used to implement it.

The sintering step (D) consists of a heat treatment to consolidate and rigidify the formed material. During this heat treatment, thermally activated diffusion phenomena are responsible for transporting material and, consequently, for densifying and coarsening the particles of the material. This treatment generally consists in raising the temperature to the optimum sintering temperature for the material in question. The term "optimum sintering temperature" denotes the temperature, below the melting point or decomposition temperature of the material, for which densification is at a maximum and growth is limited. In the case of materials of the family of BIMEVOX compounds, the sintering temperature is between 700 and 850° C. and a mean particle size after sintering of less than 5 µm and preferably less than 3 µm will be preferred.

Steps (C) and (D) may be carried out during the same operation as a single step (C') called the debinding-sintering step.

The tape casting technique is carried out by means of a casting bed.

According to a first variant of the method as defined above, the composite structure (S) resulting from step (B) undergoes a step (B') of cutting into structure elements (s). The elements (s) obtained are preferably of identical shape and size.

When it is desired to produce a solid-state electrolyte, two elements ($s_1$) and ($S_2$) obtained in step (B') may be stacked back to back, their dense faces being adjacent, in order to form an assembly (E), which then undergoes thermocompression followed by steps (C) and (D), or step (C').

In this case, the dimensions of the die for thermocompression of the assembly (E) may be tailored to the dimensions of the elements s, ($s_1$) and ($S_2$).

The thermocompression operation carried out on the assembly (E) generally consists of pressing the latter under a pressure of about 50 MPa for 5 to 10 minutes at a temperature above the glass transition temperature ($T_g$) of the organic phase used, which comprises the binder and the plasticizer. It is generally below 100° C.

According to a first particular aspect of the method forming the subject of the present invention, this comprises a prior step (P) of preparing the solid porous pore-forming substrate. This preparation more particularly comprises:

a step ($P_a$) of preparing a suspension of one or more solid pore formers in a solvent, if necessary in the presence of binders, plasticizers and/or dispersants, and with, if so desired, the addition, in a small proportion, of ceramic particles in a small proportion to said suspension;

a step ($P_b$) of casting said suspension formed in step ($P_a$) on a flat surface; and a step ($P_c$) of evaporating said solvent.

As solvent, a liquid may be chosen that is inert with respect to the pore formers and especially a liquid in which the pore formers are insoluble.

This is in general an organic solvent, for example methanol, ethanol, isopropanol, butanol, methyl ethyl ketone (MEK) or an ethanol+MEK mixture.

As dispersant, a compound or a blend of compounds is chosen which results in the electrostatic and/or stearic repulsion of the pore formers, whether they be particles, fibers or flakes, in the solvent. It is preferable to choose a compound or a blend of compounds from the family of phosphoric esters, such as BEYCOSTAT™A259, or fluoroalkyl esters or alkyl ethoxylates.

As binder, a compound or a blend of compounds is chosen that is chemically compatible with the other constituents of the suspension and of the ceramic material. Preferably, a compound having a low glass transition temperature $T_g$ is chosen. More particularly, a compound soluble in the chosen solvent is chosen. Among compounds or blends of compounds commercially available, there are polyacrylics such as DEGALAN™ or polyvinyls such as polyvinyl butyrals.

As plasticizer, a commercially available compound or blend of compounds, which is known to possess this property, is chosen, such as phthalates, such as dibutyl phthalate or butyl benzyl phthalate, or else polyethylene glycols. More particularly, a compound soluble in the chosen solvent is chosen.

As casting support, it is general practice to use a glass surface, a stainless steel or a plastic film such as, for example, a Mylar™ film or a polypropylene film.

Adding a binding agent and/or a plasticizing agent, in a small proportion, to the pore-former suspension makes it possible to obtain a porous polymer substrate that is flexible and able to be handled after solvent evaporation and that does not deteriorate during infiltration of the ceramic suspension. These compounds form bridging between the pore formers.

In general, the constituents of the suspension prepared in step ($P_a$) are chosen so that, after evaporation of the solvent, the pore-forming substrate formed does not adhere to the support on which the casting of said suspension is carried out and so that it does not crack.

If necessary, step ($P_b$) is preceded by a step ($P_d$) of deagglomerating the pore-forming particles in said suspension formed in step ($P_a$), optionally followed by a step ($P_e$) of deaerating said suspension.

The deagglomeration step generally consists of breaking up the agglomerates by mechanical action, such as grinding, for example by attrition, or with ultrasound.

The deaeration step generally consists of eliminating the air bubbles present in the suspension, for example by applying a vacuum, by rotating it in a jar or by screening.

The casting step ($P_b$) is carried out using the technique called tape casting. This technique is particularly appropriate when it is desired to obtain a ceramic material of thin planar shape. It may also be used to produce tubes by winding, for example around a mandrel, dense and porous ceramic sheets.

The tape casting technique is carried out using a casting bed. Such a device is commercially available.

According to a second particular aspect of the method forming the subject of the present invention, this comprises a prior step (Q) of preparing a ceramic suspension in a solvent.

This preparation more particularly comprises:

a step ($Q_a$) of preparing a suspension of solid ceramic particles in a solvent, in the presence of a dispersant; and a step ($Q_b$) of adding a binder and a plasticizer to the suspension prepared in step ($Q_a$)

As solvent, a liquid may be chosen that makes it possible to dissolve the organic auxiliaries used, such as the dispersants, binders or plasticizers. This is in general an organic solvent, for example methanol, ethanol, isopropanol, butanol, methyl ethyl ketone (MEK) or an ethanol+MEK mixture.

As dispersant, a compound or a blend of compounds is chosen that is chemically compatible with the other constituents of the suspension and of the ceramic material. It is preferable to choose a compound or a blend of compounds from the family of phosphoric esters, such as BEYCOSTAT™A259, or fluoroalkyl esters or alkyl ethoxylates.

As binder, a compound or a blend of compounds is chosen that is chemically compatible with the other constituents of the suspension and of the ceramic material. Preferably, a compound having a low glass transition temperature $T_g$ is chosen. More particularly, a compound soluble in the chosen solvent is chosen.

Among compounds or blends of compounds commercially available, there are polyacrylics such as DEGALAN™ or polyvinyls such as polyvinyl butyrals.

As plasticizer, a commercially available compound or blend of compounds, which is to possess this property, is chosen, such as phthalates, such as dibutyl phthalate or butyl benzyl phthalate, or else polyethylene glycols. More particularly, a compound soluble in the chosen solvent is chosen.

This preparation may include a step ($Q_c$) of deagglomerating the suspension prepared in step ($Q_a$) before it is subjected to step ($Q_b$). This deagglomeration step generally consists in breaking up the aggregates by mechanical action, such as grinding, for example by attrition or by ultrasound.

For correct implementation of the method forming the subject of the present invention, it is preferable for the powder of ceramic material, from which the suspension is prepared in step ($Q_a$) to consist of particles of equiaxed shape with a narrow size distribution centred around a mean value of between 0.1 µm and 10 µm, preferably between 0.2 µm and 1 µm.

This preparation may also include a step ($Q_d$) of deaerating the suspension obtained in step ($Q_b$).

This deaeration step generally consists in removing the air bubbles present in the suspension, for example by applying a vacuum, by rotation in a jar or by screening.

The ceramic material making up the ceramic suspension is generally chosen from doped ceramic oxides which, at the operating temperature, are in the form of a crystal lattice having oxide ion vacancies, and more particularly in the form of a cubic phase, fluorite phase, Aurivillius-type perovskite phase, brown-millerite phase or pyrochlore phase. Among these there are:

(a)—oxides of formula (I):

$$(M_aO_b)_{1-x}(R_cO_d)_x \qquad (I)$$

in which M represents at least one trivalent or tetravalent atom chosen mainly from bismuth (Bi), cerium (Ce), zirconium (Zr), thorium (Th), gallium (Ga) or hafnium (Hf), a and b are such that the $M_aO_b$ structure is electrically neutral, R represents at least one divalent or trivalent atom chosen mainly from magnesium (Mg), calcium (Ca) or barium (Ba), strontium (Sr), gadolinium (Gd), scandium (Sc), ytterbium (Yb), yttrium (Y), samarium (Sm), erbium (Er), indium (In), niobium or lanthanum (La), c and d are such that the $R_cO_d$ structure is electrically neutral and x is generally between 0.05 and 0.30 and more particularly between 0.075 and 0.15.

As examples of oxides of formula (I), there are stabilized zirconias, gallates or cerium oxides, such as:
stabilized zirconia of formula (Ia):

$$(ZrO_2)_{1-x}(Y_2O_3)_x, \qquad (Ia)$$

in which x is between 0.05 and 0.15;

(b)—perovskite materials of formula (II):

$$M_1M_2O_3, \qquad (II)$$

in which $M_1$ represents one or more atoms chosen from the families of alkaline-earth metals, lanthanides and actinides and more particularly from La, Ce, Pr, Nd, Pm, Sm, Eu, Gd, Tb, Dy, Ho, Er, Tm, Yb, Lu, Y, or Mg, Ca, Sr or Ba, and $M_2$ represents one or more atoms chosen from the transition metals, more particularly from Sc, Ti, V, Cr, Mn, Fe, Co, Ni, Cu or Zn.

As examples of oxides of formula (II), there are lanthanum nickel oxide (LaNiO$_3$), calcium lanthanum manganites (Ca$_u$La$_v$MnO$_w$), lanthanum strontium manganites (La$_u$Sr$_v$MnO$_w$), lanthanum strontium cobaltites (La$_u$Sr$_v$CoO$_w$), lanthanum calcium cobaltites (Ca$_u$La$_v$CoO$_w$) gadolinium strontium cobaltites (Gd$_u$Sr$_v$CoO$_w$) lanthanum strontium chromites (La$_u$Sr$_v$CrO$_w$) lanthanum strontium ferrites (La$_u$Sr$_v$FeO$_w$) or lanthanum strontium ferrocobaltites (La$_u$Sr$_v$CO$_d$Fe$_c$O$_w$), for which compounds the sums u+v and c+d are equal to 1, and w is such that the structure in question is electrically neutral; and (c)—compounds of the BIMEVOX family of formula (III):

$$(Bi_{2-x}M_xO_2)(V_{1-y}M'_yO_z) \qquad (III)$$

in which M represents one or more metals substituting for bismuth, chosen from those having an oxidation number of less than or equal to 3, M' represents one or more elements substituting for vanadium, chosen from those having an oxidation number of less than or equal to 5, the limiting values of x, y, and therefore z, being dependent on the nature of the substitution elements M and M'. As examples of oxides of formula (III), there are:
compounds of formula (IIIa):

$$(Bi_2O_2)(V_{1-y}M'_yO_z) \qquad (IIIa)$$

corresponding to formula (III) in which x is equal to 0 and y is different from 0 and M' is advantageously selected from alkali metals, alkaline-earth metals, transition metals or elements from Groups III to V of the Periodic Table, or from rare earths.

When M' represents a transition metal, it is more particularly zinc (Zn), copper (Cu), nickel (Ni), cobalt (Co), iron (Fe), manganese (Mn) or cadmium (Cd).

When M' is an alkaline-earth metal, it is especially calcium (Ca), strontium (Sr) or barium (Ba).

However, M' may also represent a metal having an oxidation number equal to 3, such as antimoine (Sb), indium (In) or aluminium (Al), a metal having an oxidation number equal to 4, such as titanium (Ti), tin (Sn) or ruthenium (Ru), or a substitution element having an oxidation number equal to 5, such as niobium (Nb), tantalum (Ta) or phosphorus (P).

M' may also represent an alkali metal such as sodium (Na) or may represent lead (Pb) in oxidation state 2.

As examples of compounds of formula (IIIa), there are more particularly Bi$_2$V$_{0.9}$Co$_{0.1}$O$_{5.35}$ (called BICOVOX 10) or Bi$_2$V$_{0.8}$Cu$_{0.1}$O$_{5.35}$ (called BICUVOX 10);
compounds of formula (IIIb):

$$(Bi_{2-x}M_xO_2)(VO_z) \qquad (IIIb)$$

corresponding to formula (III) in which y is equal to 0 and x is different from 0, M is as defined above and more particularly chosen from rare earths such as lanthanum.

Mention may also be made among compounds of formula (III) of those in which the oxygen atom is partially substituted with fluorine, or else those having mixed bismuth and vanadium substitutions. As compositions of this type, there are, for example, compounds of formula (IIIc):

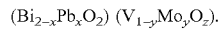

$(Bi_{2-x}Pb_xO_2)(V_{1-y}Mo_yO_z)$.

In general, when the ceramic material used is a powder of a compound from the family of BIMEVOXs, the mean particle size is between 0.2 and 50 microns.

The subject of the invention is also a method and its variant such as those defined above, characterized in that the constituent ceramic material of the ceramic suspension is chosen from carbides or nitrides such as silicon carbide SiC or silicon nitride $Si_3N_4$, alumina $Al_2O_3$, aluminium silicates or their derivatives such as mullite $(2SiO_2.3Al_2O_3)$, SiAlON or cordierite $(Mg_2Al_4Si_5O_{18})$, magnesia (MgO), calcium phosphates and its derivatives such as hydroxyapatite $[Ca_4(CaF)(PO_4)_3]$, tricalcium phosphate $[Ca_3(PO_4)_2]$ and undoped ceramic oxides such as zirconia $(ZrO_2)$ or ceria $(CeO_2)$.

According to another aspect of the present invention, this relates to a ceramic material obtained by the method as defined above and to a solid-state electrolyte or a mixed ionic/electronic conductor, these being obtained by the variant of said method as defined above.

The subject of the invention is also an electrochemical cell comprising the solid-state electrolyte, as defined above, and a mixed ionically/electronically conducting ceramic membrane comprising a mixed ionic/electronic conductor as defined above.

According to another aspect of the present invention, this relates to the use of the solid-state electrolyte obtained by the variant of the method as defined above, to extract oxygen from a gaseous mixture containing it or to analyze for the presence of oxygen in a gaseous atmosphere. Mention may be made in particular of the use of the solid-state electrolyte obtained by the variant of the method as defined above either to produce ultrapure oxygen or, in applications requiring oxygen-free atmospheres, such as the electronic components industry or the food industry, to remove oxygen from said atmosphere, said gaseous atmosphere being above a solid or a liquid.

This is why the subject of the invention is also a method for producing ultrapure oxygen, consisting in separating oxygen from air by ionic conduction through an electrochemical cell as defined above and a method for eliminating oxygen from a gaseous atmosphere in which applications requiring oxygen-free atmospheres are carried out, consisting in separating oxygen from said atmosphere by ionic conduction through an electrochemical cell as defined above.

It is also possible to use a ceramic membrane as defined above to produce oxygen which is used directly in a chemical reaction, especially with hydrogen in order to produce electrical energy, for example, in a solid-state fuel cell of the SOFC type or in conventional reactions in petrochemistry.

This is why the subject of the invention is also a method for producing thermal and electrical energy within a solid-state fuel cell, by the reaction of oxygen with hydrogen, characterized in that said oxygen is obtained by separating it from air, by mixed ionic/electronic conduction through a ceramic membrane as defined above, a method for producing syngas by the catalytic reaction of natural gas with steam and oxygen, characterized in that said oxygen is obtained by separating it from air, by mixed ionic/electronic conduction through a-ceramic membrane as defined above, a method for producing ultrapure oxygen, characterized in that said oxygen is separated from air by mixed ionic/electronic conduction through a ceramic membrane as defined above and an industrial process for synthesizing an organic compound, comprising at least one oxidation step using gaseous oxygen, characterized in that said oxygen is obtained by separating it from air, by mixed ionic/electronic conduction through a ceramic membrane as defined above.

Finally, the subject of the invention is the use of a thin ceramic material with a controlled surface porosity gradient, prepared by the method as defined above, in order to produce filter membranes for gases or liquids, ceramic-to-metal seals, biomaterials or sensors.

As ceramic materials used in these applications, there are, for example, carbides or nitrides such as silicon carbide SiC or silicon nitride $Si_3N_4$, alumina $Al_2O_3$, aluminium silicates or their derivatives such as mullite $(2SiO_2.3Al_2O_3)$, SiAlON or cordierite $(Mg_2Al_4Si_5O_{18})$, magnesia (MgO), calcium phosphates and its derivatives such as hydroxyapatite $[Ca_4(CaF)(PO_4)_3]$, tricalcium phosphate $[Ca_3(PO_4)_2]$ and undoped ceramic oxides such as zirconia $(ZrO_2)$ or ceria $(CeO_2)$.

The figures appended to this description illustrate the invention without however limiting it.

FIG. 1 shows the various steps of the method for producing a ceramic membrane with a continuous controlled surface porosity gradient.

Figure 2:
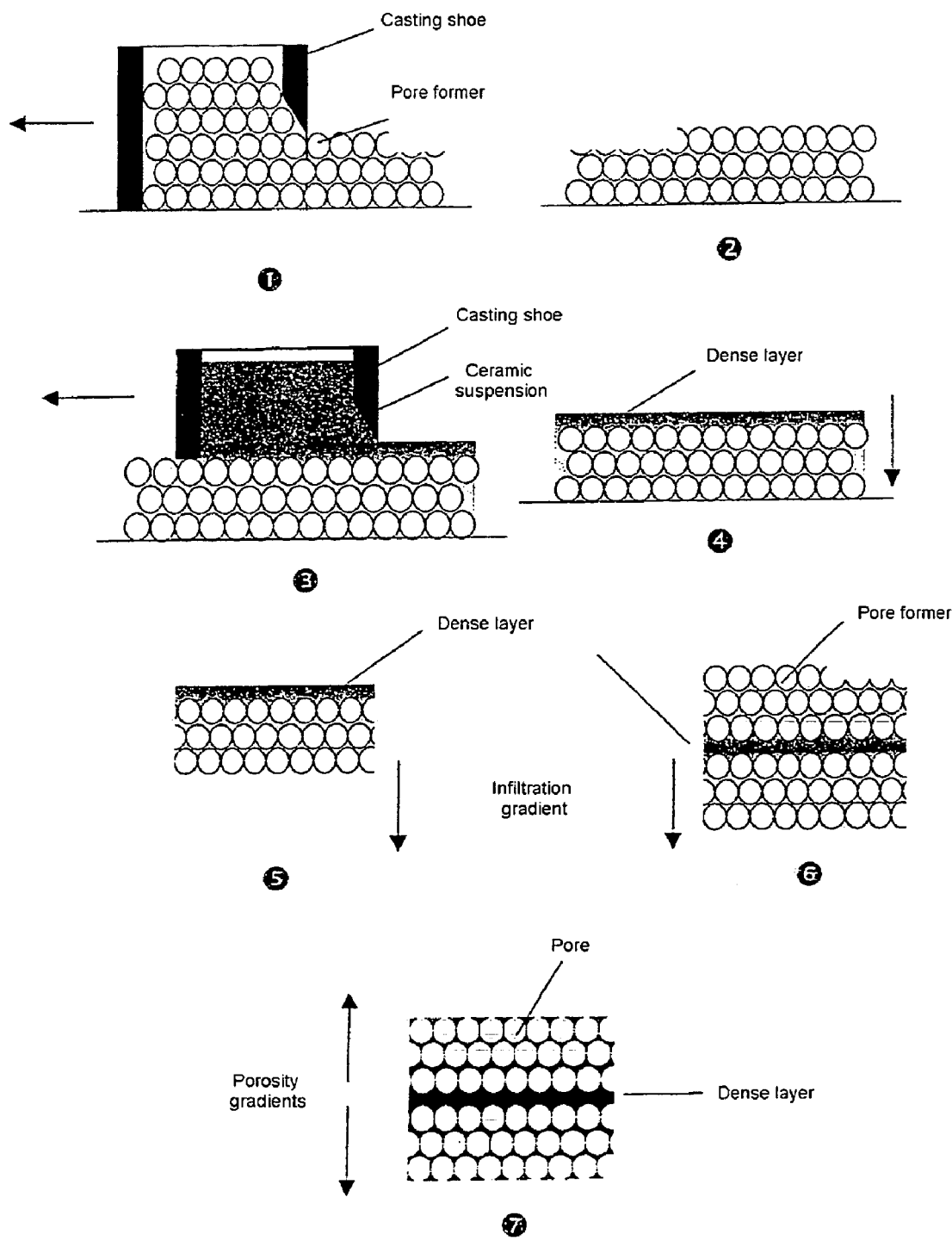
FIG. 2 illustrates the method of infiltration, by tape casting of a bed of pore former, by a ceramic suspension according to one illustrative embodiment of the present invention.

FIG. 2 illustrates the method of infiltration, by tape casting of a bed of pore former, by a ceramic suspension. The steps are the following:

1 Production of a porous pore-forming substrate by tape casting, on a flexible plastic film (Mylar™ for example), of a suspension of pore-forming particles (solvent+pore formers+organics);

2 Evaporation of the solvent;

3 Infiltration of the porous pore-forming substrate by a ceramic suspension of controlled viscosity and controlled rheological behavior. The viscosity and the rheological behavior determine the infiltration of the suspension into the porous pore-forming substrate and therefore the porosity gradient;

4 Evaporation of the solvent;

5 Cutting of the tape;

6 Stacking, for example back to back, in order to obtain a dense core and two symmetrical porous surfaces, and thermocompression; and 7 Debinding—sintering.

Figure 3:
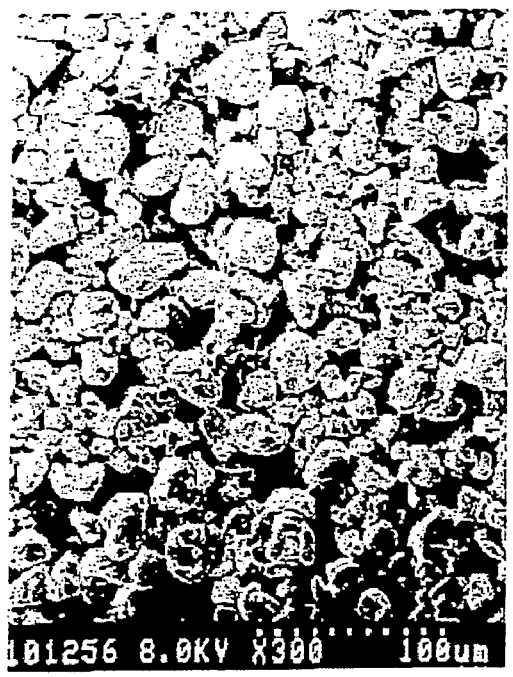
FIG. 3 illustrates is a photograph obtained by electron scanning microscopy of the surface of a porous pore-forming substrate consisting of a stack of micronized polypropylene wax particles 25 μm in size.

FIG. 3 is a photograph obtained by electron scanning microscopy of the surface of a porous pore-forming substrate consisting of a stack of micronized polypropylene wax particles 25 μm in size, manufactured by MicroPowders, Inc.)

Figure 4:
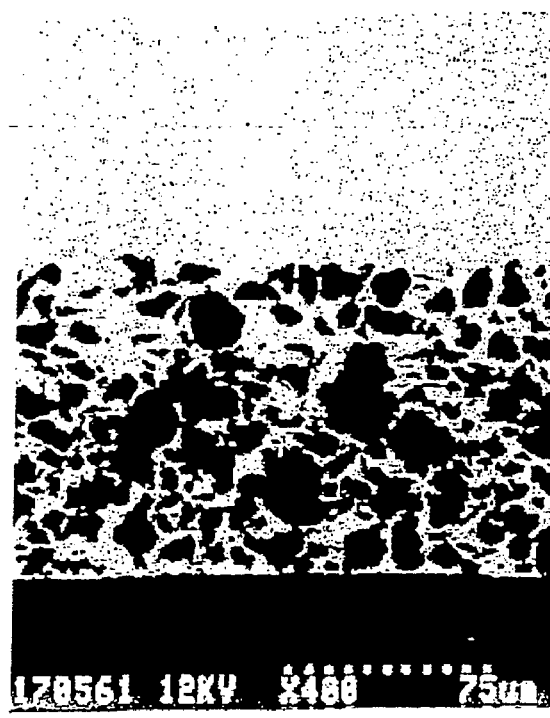
FIG. 4 illustrates is a photograph obtained by scanning electron microscopy of a polished section of a material obtained by infiltration of a porous pore-forming substrate consisting of a stack of 25 μm micronized polypropylene wax particles.

FIG. 4 is a photograph obtained by scanning electron microscopy of a polished section of a material obtained by infiltration of a porous pore-forming substrate consisting of a stack of 25 μm micronized polypropylene wax particles manufactured by MicroPowders, Inc.) by a BICOVOX 10 suspension. The BICOVOX 10 suspension was formed from about 30 to 50 g of BICOVOX 10 powder (particle size<1 μm), 0.2 g to 2 g of A259™ dispersant sold in France by CECA—Atochem, 0.5 g to 5 g of DEGALAN™5107 binder sold in France by DEGUSSA—Huls and 0.5 g to 5 g of dibutyl phthalate in a methyl ethyl ketone/ethanol mixture so that the volume ratio of dry matter to the volume of solvent was between 25% and 35%.

The total porosity of the porous zone was estimated to be 60% by image analysis. It was observed that the thin ceramic membrane (thickness between 150 µm and 250 µm) obtained by this method had a continuous controlled surface porosity gradient and continuity between dense zone and porous zone, preventing any delamination or disbanding between the dense and porous materials during sintering.

Figure 5:
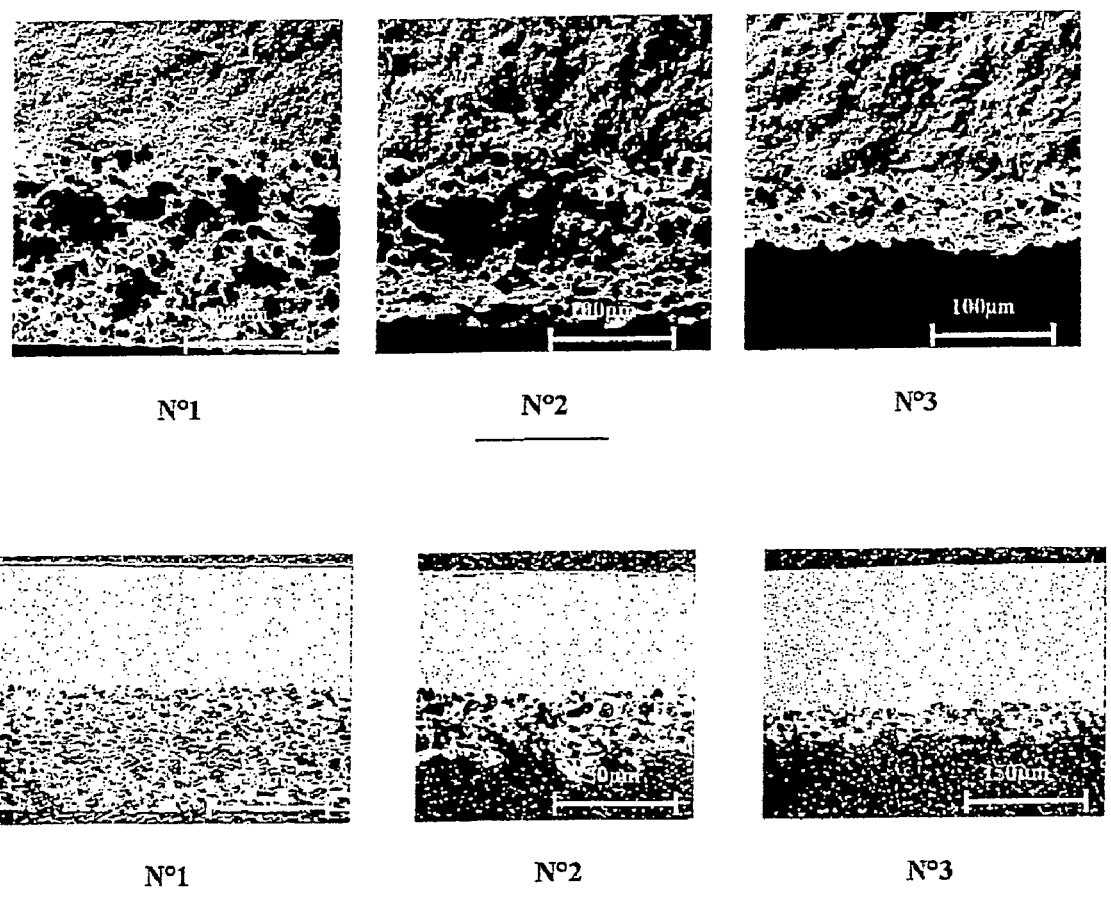
FIG. 5 illustrates a collection of various photographs obtained by scanning electron microscopy of fractured polished sections of sintered materials, which illustrate the effect of the composition of the porous pore-forming substrate, formed from a stack of 25 μm micronized polypropylene wax particles, on the infiltration by the tape-cast ceramic suspension prepared above.

FIG. 5 is a collection of various photographs obtained by scanning electron microscopy of fractured polished sections of sintered materials, which illustrate the effect of the composition of the porous pore-forming substrate, formed from a stack of 25 µm micronized polypropylene wax particles, on the infiltration by the tape-cast ceramic suspension (BICOVOX. 10 particles<1 µm) prepared above.

The volume proportions of the various phases in the porous pore-forming substrate are given in the following table:

|  |  | Photograph number | | |
|---|---|---|---|---|
|  |  | 1 | 2 | 3 |
| Volume composition (%) | Solvent + polypropylene wax | 100% | 95% | 90% |
|  | Binder | 0% | 2.5% | 5% |
|  | Plasticizer | 0% | 2.5% | 5% |

Figure 6:
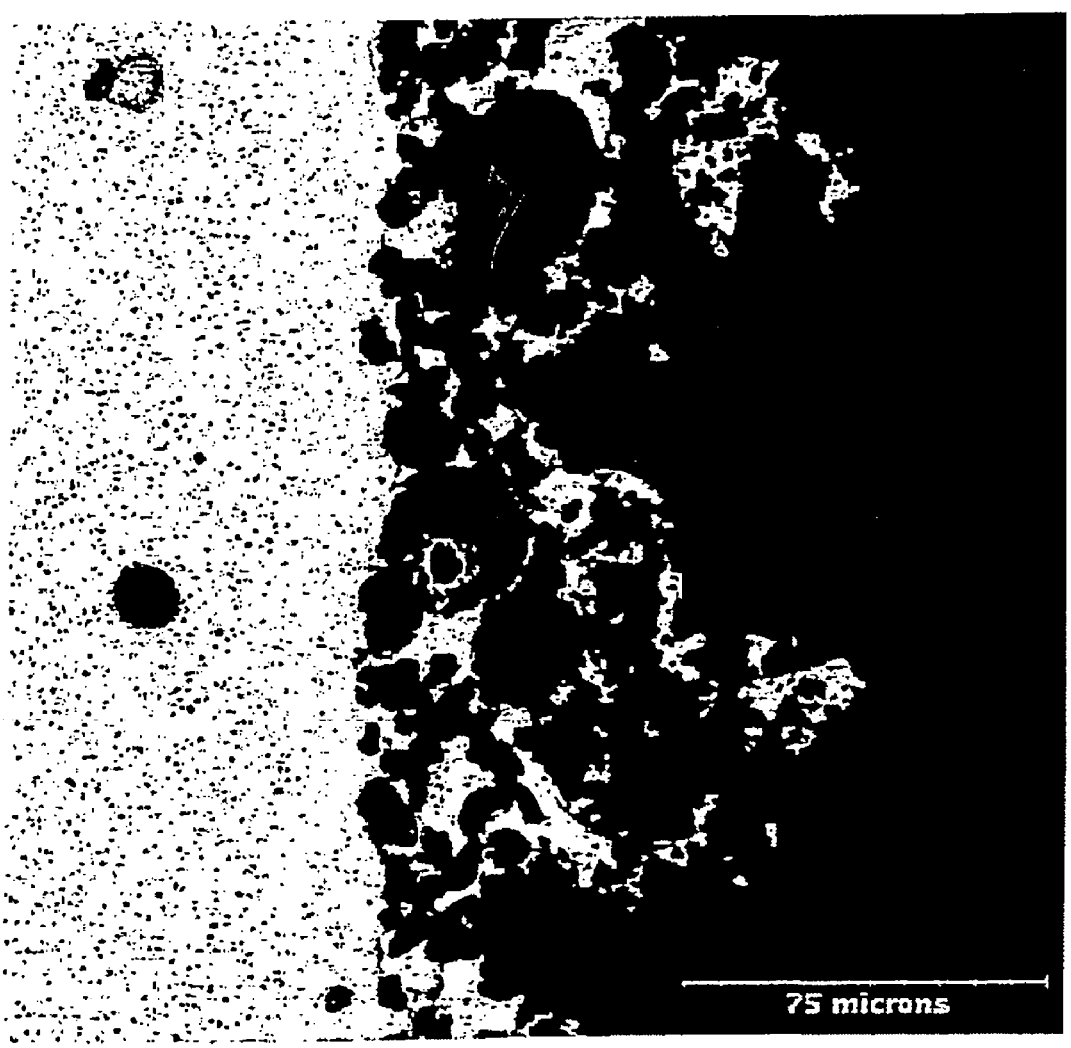
FIG. 6 illustrates a photograph obtained by scanning electron microscopy of a polished section of a sintered material obtained by infiltration of a porous pore-forming substrate formed from various types of pore formers by a BICUVOX.10 suspension.

FIG. 6 is a photograph obtained by scanning electron microscopy of a polished section of a sintered material obtained by infiltration of a porous pore-forming substrate formed from various types of pore formers by a BICUVOX.10 suspension.

Figure 7:
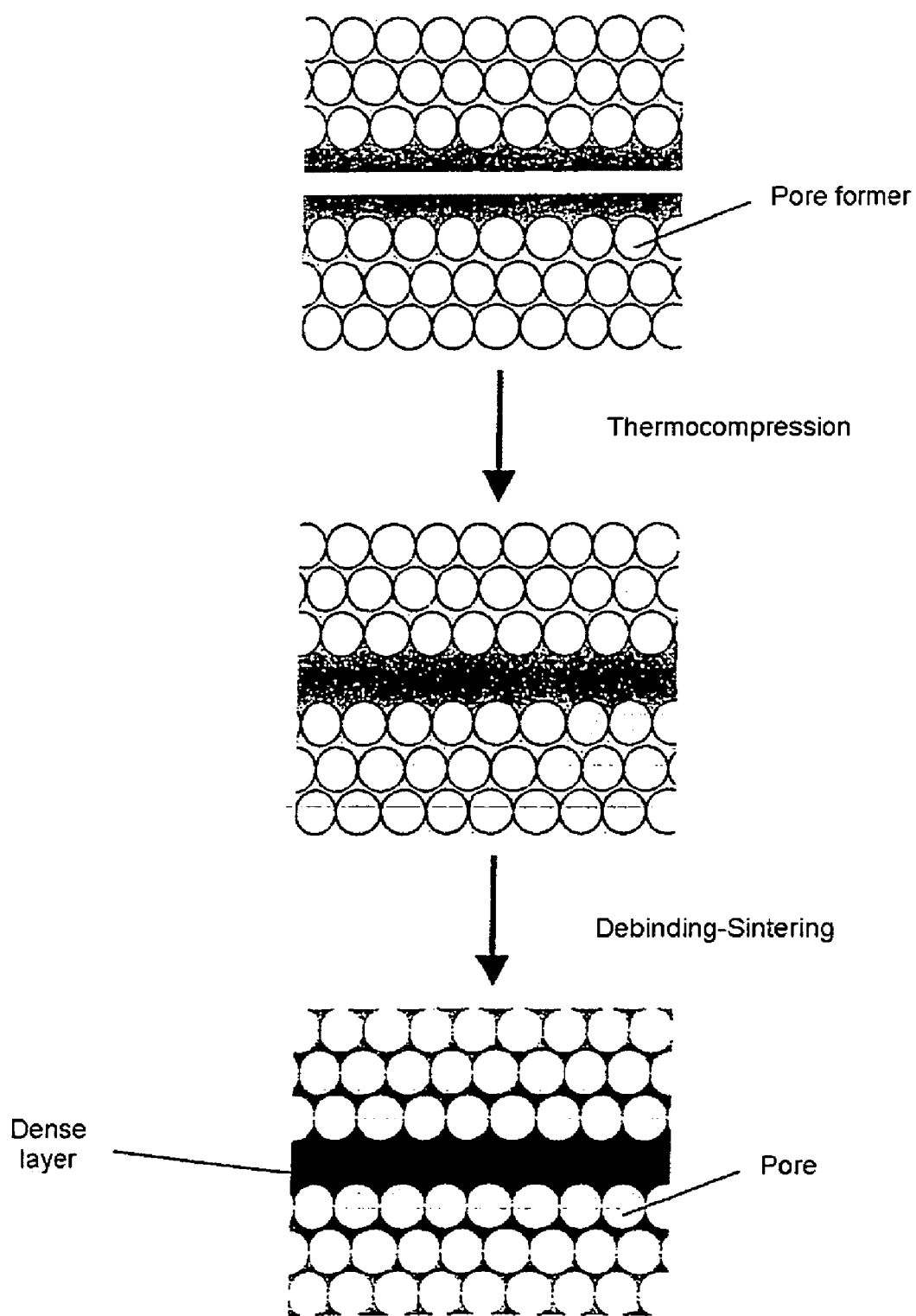
FIG. 7 illustrates the manufacture of porous/dense/porous multilayer elements by thermocompression, in the green state, of a stack of two back-to-back tapes. It is possible to produce porous/dense/porous multilayers having a continuous controlled porosity gradient by the method of production employed.

FIG. 7 illustrates the manufacture of porous/dense/porous multilayer elements by thermocompression, in the green state, of a stack of two back-to-back tapes. It is possible to produce porous/dense/porous multilayers having a continuous controlled porosity gradient by the method of production employed.

Figure 8:
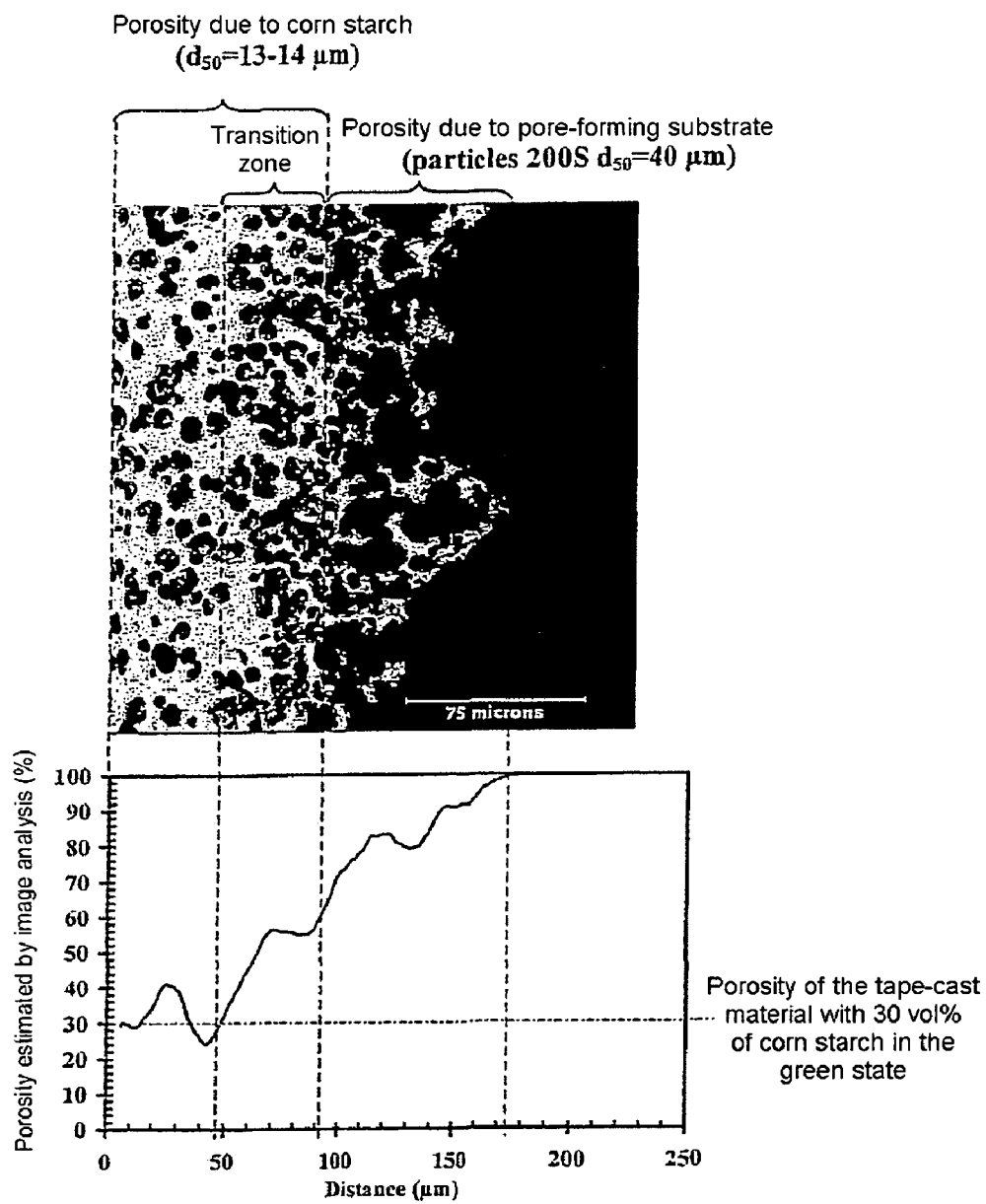
FIG. 8 illustrates a photograph obtained by scanning electron microscopy coupled with image analysis of BICUVOX.10 having a controlled surface porosity gradient, obtained by infiltration of PROPYLTEXTM™200S by a BICUVOX.10 suspension containing 30 vol % of corn starch.

FIG. 8 is a photograph obtained by scanning electron microscopy coupled with image analysis of BICUVOX.10 having a controlled surface porosity gradient, obtained by infiltration of PROPYLTEX™ 200S by a BICUVOX.10 suspension containing 30 vol % of corn starch.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A method for preparing a thin ceramic material with a controlled surface porosity gradient, comprising:
    a) a step (P) of preparing the porous pore-forming substrate of a controlled thickness;
    b) a step (Q) of preparing a ceramic suspension in a solvent;
    c) a step (A) of infiltrating said porous pore-forming substrate of a controlled thickness with said suspension of a ceramic material;
    d) a step (B) of evaporating said solvent, in order to form a pore former/solid ceramic composite structure (S);
    e) a step (B') of cutting said composite structure (S) into structure elements (S);
    f) a step (E) of forming an assembly from the two elements ($s_1$) and ($s_2$) obtained in step (B'), wherein said elements are stacked back to back with their dense faces being adjacent;
    g) a step of thermocompression;
    h) a step (C) of debinding; and
    i) a step (D) of sintering, wherein a constituent ceramic material of the ceramic suspension is chosen from oxides of formula (I):

oxides of formula (I):

$$(M_aO_b)_{1-x}(R_cO_d)_x \qquad (I)$$

in which M represents at least one trivalent or tetravalent atom chosen mainly from bismuth (Bi), cerium (Ce), zirconium (Zr), thorium (Th), gallium (Ga) or hafnium (Hf), a and b are such that the $M_aO_b$ structure is electrically neutral, R represents at least one divalent or trivalent atom chosen mainly from magnesium (Mg), calcium (Ca) or barium (Ba), strontium (Sr), gadolinium (Gd), scandium (Sc), ytterbium (Yb), yttrium (Y), samarium (Sm), erbium (Er), indium (In), niobium (Nb) or lanthanum (La), c and d are such that the $R_cO_d$ structure is electrically neutral and x is between about 0.05 and about 0.30.

2. The method as defined in claim 1, wherein said x is between about 0.075 and about 0.15.

3. The method as defined in claim 2, wherein the constituent ceramic material of the ceramic suspension is chosen from stabilized zirconias, gallates or cerium oxides, such as, for example, stabilized zirconia of formula (Ia):

$$(ZrO_2)_{1-x}(Y_2O_3)_x, \qquad (Ia)$$

in which x is between about 0.05 and about 0.15.

4. A method for preparing a thin ceramic material with a controlled surface porosity gradient, comprising:
    a) a step (P) of preparing the porous pore-forming substrate of a controlled thickness;
    b) a step (Q) of preparing a ceramic suspension in a solvent;
    c) a step (A) of infiltrating said porous pore-forming substrate of a controlled thickness with said suspension of a ceramic material;
    d) a step (B) of evaporating said solvent, in order to form a pore former/solid ceramic composite structure (S);
    e) a step (B') of cutting said composite structure (S) into structure elements (S);
    f) a step (E) of forming an assembly from the two elements ($s_1$) and ($s_2$) obtained in step (B'), wherein said elements are stacked back to back with their dense faces being adjacent;
    g) a step of thermocompression;
    h) a step (C) of debinding; and
    i) a step (D) of sintering, wherein
        the ceramic material making up the ceramic suspension is chosen from doped ceramic oxides which, at the operating temperature, are in the form of a crystal lattice having oxide ion vacancies; and
        the constituent ceramic material of the ceramic suspension is chosen from perovskite materials of formula (II):

$$M_1M_2O_3, \qquad (II)$$

in which $M_1$ represents one or more atoms chosen from the families of alkaline-earth metals, lanthanides and actinides and $M_2$ represents one or more atoms chosen from the transition metals.

5. The method as defined in claim 4, wherein said $M_1$ represents La, Ce, Pr, Nd, Pm, Sm, Eu, Gd, Tb, Dy, Ho, Er, Tm, Yb, Lu, Y, or Mg, Ca, Sr or Ba.

6. The method as defined in claim 4, wherein said $M_2$ represents Sc, Ti, V, Cr, Mn, Fe, Co, Ni, Cu or Zn.

7. The method as defined in claim 4, wherein the constituent ceramic material of the ceramic suspension is chosen from lanthanum nickel oxide ($LaNiO_3$), calcium lanthanum manganites ($Ca_uLa_vMnO_w$), lanthanum strontium manganites ($La_uSr_vMnO_2$), lanthanum strontium cobaltites ($La_uSr_vCoO_w$), lanthanum calcium cobaltites ($Ca_uLa_v$-$CoO_w$), gadolinium strontium cobaltites ($Gd_uSr_yCoO_w$), lanthanum strontium chromites ($La_uSr_vCrO_w$), lanthanum strontium ferrites ($La_uSr_vFeO_w$) or lanthanum strontium ferrocobaltites ($La_uSr_vCo_dFe_cO_w$), for which compounds the sums u+v and c+d are equal to 1, and w is such that the structure in question is electrically neutral.

8. The method as defined in claim 7, wherein said compound is of formula (IIa):

$$La_{0.6}Sr_{0.4}Co_{0.8}Fe_{0.2}O_w \tag{IIa}$$

in which said w is such that the structure of formula (IIa) is electrically neutral.

9. A method for preparing a thin ceramic material with a controlled surface porosity gradient, comprising:
   a) a step (P) of preparing the porous pore-forming substrate of a controlled thickness;
   b) a step (Q) of preparing a ceramic suspension in a solvent;
   c) a step (A) of infiltrating said porous pore-forming substrate of a controlled thickness with said suspension of a ceramic material;
   d) a step (B) of evaporating said solvent, in order to form a pore former/solid ceramic composite structure (S);
   e) a step (B') of cutting said composite structure (S) into structure elements (S);
   f) a step (E) of forming an assembly from the two elements ($s_1$) and ($s_2$) obtained in step (B'), wherein said elements are stacked back to back with their dense faces being adjacent;
   g) a step of thermocompression;
   h) a step (C) of debinding; and
   i) a step (D) of sintering, wherein:
      the constituent ceramic material of the ceramic suspension is chosen from compounds of formula (III):

$$(Bi_{2-x}M_xO_2)(V_{1-y}M'_yO_z) \tag{III}$$

in which M represents one or more metals substituting for bismuth, chosen from those having an oxidation number of less than or equal to 3, M' represents one or more elements substituting for vanadium, chosen from those having an oxidation number of less than or equal to 5, the limiting values of x, y, and therefore z, being dependent on the nature of the substitution elements M and M'.

10. The method and its variant as defined in claim 9, wherein the constituent ceramic material of the ceramic suspension is chosen from compounds of formula (IIIa):

$$(Bi_2O_2)(V_{1-y}M'_yO_z) \tag{IIIa}$$

corresponding to formula (III) in which x is equal to 0 and y is different from 0 and M' is selected from alkali metals, alkaline-earth metals, transition metals or elements from Groups III to V of the Periodic Table, or from rare earths and is more particularly chosen from between $Bi_2V_{0.9}Co_{0.1}O_{5.35}$ and $Bi_2V_{0.9}Cu_{0.1}O_{5.35}$.

11. A method for preparing a thin ceramic material with a controlled surface porosity gradient, comprising:
   a) a step (A) of infiltrating a porous pore-forming substrate of controlled thickness with a suspension of a ceramic material, wherein the ceramic material making up the ceramic suspension is selected from doped ceramic oxides which, at the operating temperature, are in the form of a crystal lattice having oxide ion vacancies;
   b) a step (B) of evaporating the solvent present in the ceramic suspension in order to form a pore former/solid ceramic composite structure;
   c) a step (C) of debinding; and
   d) a step (D) of sintering step,
wherein the constituent ceramic material of the ceramic suspension is selected from compounds of formula (IIIb):

$$(Bi_{2-x}M_xO_2)(VO_z) \tag{IIIb}$$

in which x is different from 0, and wherein M represents one or more rare earth metals substituting for bismuth, selected from those having an oxidation number of less than or equal to 3, and M is lanthanum.

12. A method for preparing a thin ceramic material with a controlled surface porosity gradient, comprising:
   a) a step (P) of preparing the porous pore-forming substrate of a controlled thickness;
   b) a step (Q) of preparing a ceramic suspension in a solvent;
   c) a step (A) of infiltrating said porous pore-forming substrate of a controlled thickness with said suspension of a ceramic material;
   d) a step (B) of evaporating said solvent, in order to form a pore former/solid ceramic composite structure (S);
   e) a step (B') of cutting said composite structure (S) into structure elements (S);
   f) a step (E) of forming an assembly from the two elements ($s_1$) and ($s_2$) obtained in step (B'), wherein said elements are stacked back to back with their dense faces being adjacent;
   g) a step of thermocompression;
   h) a step (C) of debinding; and
   i) a step (D) of sintering, wherein a constituent ceramic material of the ceramic suspension is chosen from carbides or nitrides consisting of silicon carbide SiC, silicon nitride $Si_3N_4$, alumina $Al_2O_3$, aluminum silicates, aluminum silicate derivatives, mullite ($2SiO_2.3Al_2O_3$), SiAlON, cordierite ($Mg_2Al_4Si_5O_{18}$), magnesia (MgO), calcium phosphates, calcium phosphate derivatives, hydroxyapatite [$Ca_4(CaF)(PO_4)_3$], tricalcium phosphate [$Ca_3(PO_4)_2$], undoped ceramic oxides, zirconia ($ZrO_2$) and ceria ($CeO_2$).

* * * * *

UNITED STATES PATENT AND TRADEMARK OFFICE
CERTIFICATE OF CORRECTION

| | | |
|---|---|---|
| PATENT NO. | : 7,223,356 B2 | Page 1 of 1 |
| APPLICATION NO. | : 10/433042 | |
| DATED | : May 29, 2007 | |
| INVENTOR(S) | : Thierry Chartier and François Guillotin | |

It is certified that error appears in the above-identified patent and that said Letters Patent is hereby corrected as shown below:

Claim 1
In Column 12, line 2, replace the reference "S" with --s--.

Claim 4
In Column 12, line 47, replace the reference "S" with --s--.

Claim 9
In Column 13, line 36, replace the reference "S" with --s--.

Claim 12
In Column 14, line 41, replace the reference "S" with --s--.

Signed and Sealed this

Seventeenth Day of July, 2007

JON W. DUDAS
*Director of the United States Patent and Trademark Office*